(No Model.)
F. P. DEWEY.
PROCESS OF CONDENSING FUMES FROM METALLURGIC FURNACES.
No. 411,014. Patented Sept. 17, 1889.
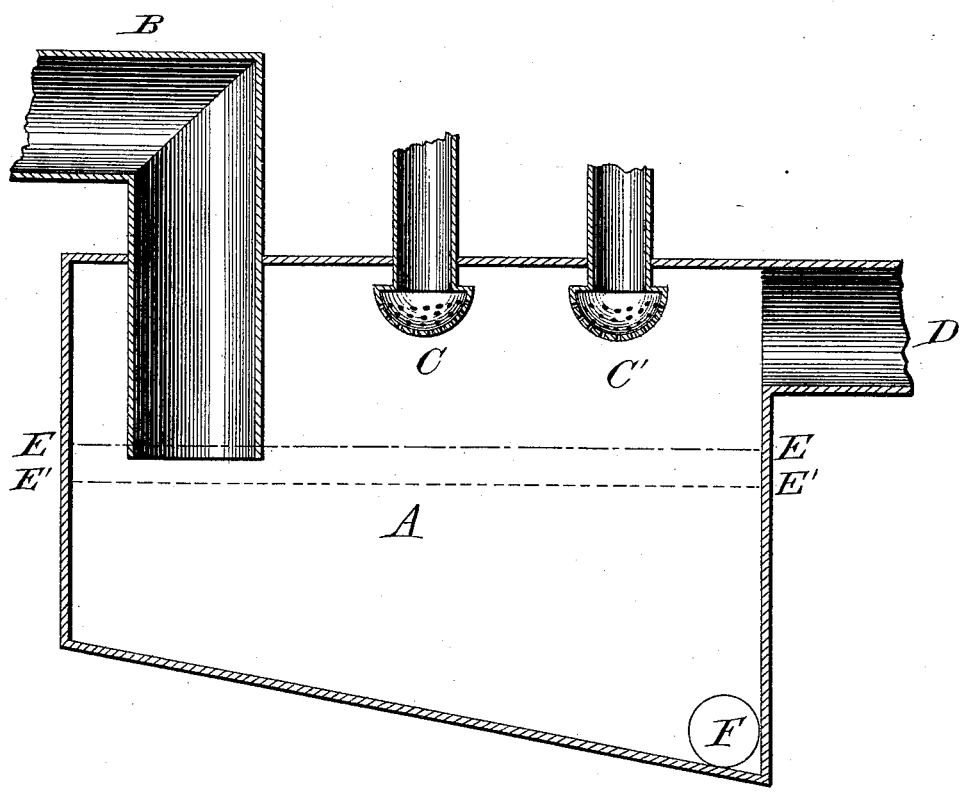
Witnesses:
W. H. Newhall,
G. C. Neale.
Inventor:
Frederic P. Dewey.

UNITED STATES PATENT OFFICE.

FREDERIC P. DEWEY, OF WASHINGTON, DISTRICT OF COLUMBIA.

PROCESS OF CONDENSING FUMES FROM METALLURGIC FURNACES.

SPECIFICATION forming part of Letters Patent No. 411,014, dated September 17, 1889.

Application filed February 29, 1888. Serial No. 265,748. (No model.)

*To all whom it may concern:*

Be it known that I, FREDERIC P. DEWEY, a citizen of the United States, residing at Washington, in the District of Columbia, have invented a certain new and useful Process of Condensing Fumes from Metallurgic Furnaces; and I do hereby declare that the following is a full, clear, and exact description of the invention, which will enable others skilled in the art to which it belongs to make and use the same.

In many smelting operations a mixture of solid material in a fine state of subdivision and gases is given off from the charge, and this mixture is generally called "fume." The solid material of the fume carries some of the valuable metal or metals of the charge and occasions much loss if not collected and utilized. Many methods have been proposed to catch and use this material; but they have been only partially successful in catching the material, or too expensive in their application. After the solid material has been collected it may be utilized in a variety of ways, as in the manufacture of pigments from the fume from lead-smelting; but generally it is smelted for the metal or metals it contains.

With the exception of a single method, which proposed to use electricity to settle and collect the solid material, all the methods heretofore used or proposed may be divided into two classes—methods using water, and methods using purely mechanical means dry. My method belongs in part to the first class, and is in part entirely new and novel. It is well known that the failure of the wet methods to completely stop the solid materials is due to the fact that the water does not moisten the particles of solid matter in whatever form it may be applied. I have discovered that by adding certain organic chemicals to the water the solid particles will be immediately moistened and consequently retained; also, that certain related organic chemicals which are not soluble in or mixable with water have the same power of moistening and retaining the solid particles. I use the following classes of organic chemicals: Crude petroleum and the products of its refining except the coke, organic acids and salts of the same, alcohols and alcoholic derivatives, waxes, fats, resins, turpenes, bisulphide of carbon, and fixed, drying, and essential oils.

The proper action may be obtained by passing the fumes over the surface or by passing them through or by treating them to a shower-bath of the chemicals, or by combinations of these methods of treatment.

In a few cases it may be necessary to melt the chemicals by external heat before application; but in most cases the ordinary heat of the fumes will be sufficient to maintain the fluidity on the bath.

One of the chemicals is generally sufficient for the bath; but in some cases it is better and cheaper to use a mixture of two or more. The chemicals soluble in water are generally used in aqueous solution.

The drawing represents a convenient form of apparatus for the application of chemicals in vertical section; but the details may vary greatly from those given.

A is a chamber into which the fumes from the furnace are conducted by the pipe B.

C C' are roses delivering the chemicals as spray.

D is the outlet for the gases.

E E represent the level at which the chemicals must be maintained within the chamber when it is desired to force the fumes through the chemicals.

E' E' represent a level allowing the fumes to flow over the surface of the chemicals.

F is a door for the removal of the collected material.

What I claim as new and valuable is—

The process of catching and saving the fumes arising from metallurgic operations, which consists in subjecting such fumes to the action of an organic chemical bath, as herein described.

FREDERIC P. DEWEY.

Witnesses:
W. H. NEWHALL,
G. C. NEALE.